(12) United States Patent
Zhao et al.

(10) Patent No.: US 12,715,438 B2
(45) Date of Patent: Aug. 25, 2026

(54) PERSONALIZED ADAPTIVE CRUISE CONTROL BASED ON STEADY-STATE OPERATION

(71) Applicant: TOYOTA MOTOR ENGINEERING & MANUFACTURING NORTH AMERICA, INC., Plano, TX (US)

(72) Inventors: Zhouqiao Zhao, Riverside, CA (US); Ziran Wang, San Jose, CA (US); Rohit Gupta, Santa Clara, CA (US); Kyungtae Han, Palo Alto, CA (US); Prashant Tiwari, Santa Clara, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 394 days.

(21) Appl. No.: 17/578,330

(22) Filed: Jan. 18, 2022

(65) Prior Publication Data

US 2023/0227037 A1 Jul. 20, 2023

(51) Int. Cl.
*B60W 30/165* (2020.01)
*B60W 40/105* (2012.01)
(Continued)

(52) U.S. Cl.
CPC ........ *B60W 30/165* (2013.01); *B60W 40/105* (2013.01); *B60W 50/10* (2013.01); *G06N 20/00* (2019.01); *B60W 2554/802* (2020.02)

(58) Field of Classification Search
CPC .. B60W 30/165; B60W 40/105; B60W 50/10; B60W 2554/802;
(Continued)

(56) References Cited

U.S. PATENT DOCUMENTS 9,266,536 B2 2/2016 Loria
2017/0057517 A1* 3/2017 Huq .................... B60W 50/082
(Continued)

FOREIGN PATENT DOCUMENTS

CN 107757621 A 3/2018
CN 109895770 B 10/2020
(Continued)

OTHER PUBLICATIONS

Guo, Longxiang, et al. "Determining headway for personalized autonomous vehicles by learning from human driving demonstration." 2017 IEEE 7th Annual International Conference on CYBER Technology in Automation, Control, and Intelligent Systems (CYBER). IEEE, 2017. (Year: 2017).*
(Continued)

*Primary Examiner* — Faris S Almatrahi
*Assistant Examiner* — Dana F Artimez
(74) *Attorney, Agent, or Firm* — SHEPPARD, MULLIN, RICHTER & HAMPTON LLP; Daniel N. Yannuzzi

(57) ABSTRACT

A personalized adaptive cruise control (P-ACC) system and associated algorithm are disclosed for determining a driver's preferred following gap in relation to vehicle speed based on periods of steady-state operation of a vehicle. While the P-ACC system is activated, vehicle transition states initiated by driver manual interventions such as takeover or overwrite events are used to identify subsequent periods of vehicle steady-state operation. Vehicle dynamics data captured during periods of steady-state operation is stored as steady-state data, which is then used to train a machine learning model to learn the driver's preferred following gap. This learned relationship is fed into second-order vehicle dynamics to determine a target acceleration for achieving the desired following gap while the P-ACC system is activated. Upon achieving the desired following gap, the vehicle speed may
(Continued)

be held constant to maintain the following gap unless a change in lead vehicle speed necessitates updating the following gap.

17 Claims, 9 Drawing Sheets

(51) Int. Cl.
*B60W 50/10* (2012.01)
*G06N 20/00* (2019.01)

(58) Field of Classification Search
CPC ..... B60W 2050/0083; B60W 2520/10; B60W 2540/10; B60W 2540/30; B60W 30/16; B60W 40/09; B60W 2050/0075; G06N 20/00
See application file for complete search history.

(56) References Cited

U.S. PATENT DOCUMENTS

2020/0047756 A1* 2/2020 Yoo .................. B60W 50/0098
2020/0094815 A1 3/2020 Tan
2020/0180623 A1* 6/2020 Bohrer ................ B60W 50/045
2020/0247429 A1* 8/2020 Tram .................... B60W 30/16
2021/0024066 A1 1/2021 Hornstein
2021/0300365 A1* 9/2021 McCormick .......... B60W 50/06

FOREIGN PATENT DOCUMENTS

CN 111267847 B 8/2021
DE 102016003925 A1 10/2016

OTHER PUBLICATIONS

Nishiwaki et al., "Generation of Pedal Operation Patterns of Individual Drivers in Car-Following for Personalized Cruise Control," 2007 IEEE Intelligent Vehicles Symposium, Jun. 2007, 5 pages (https://ieeexplore.ieee.org/document/4290218).
Angkititrakul et al., "Modeling and Adaptation of Stochastic Driver-Behavior Model with Application to Car Following," 2011 IEEE Intelligent Vehicles Symposium (IV), pp. 814-819, Jun. 2011 (https://ieeexplore.ieee.org/document/5940464).
Chen et al., "A Learning Model for Personalized Adaptive Cruise Control," IEEE Intelligent Vehicles Symposium (IV), pp. 379-384, Jul. 31, 2017 (https://ieeexplore.ieee.org/document/7995748).
Zhu et al., "Typical-Driving-Style-Oriented Personalized Adaptive Cruise Control Design Based on Human Driving Data," Journal of Transportation Research Part C: Emerging Technologies, vol. 100, pp. 274-288, Mar. 1, 2019 (https://www.sciencedirect.com/science/article/abs/pii/S0968090X18306521).

* cited by examiner

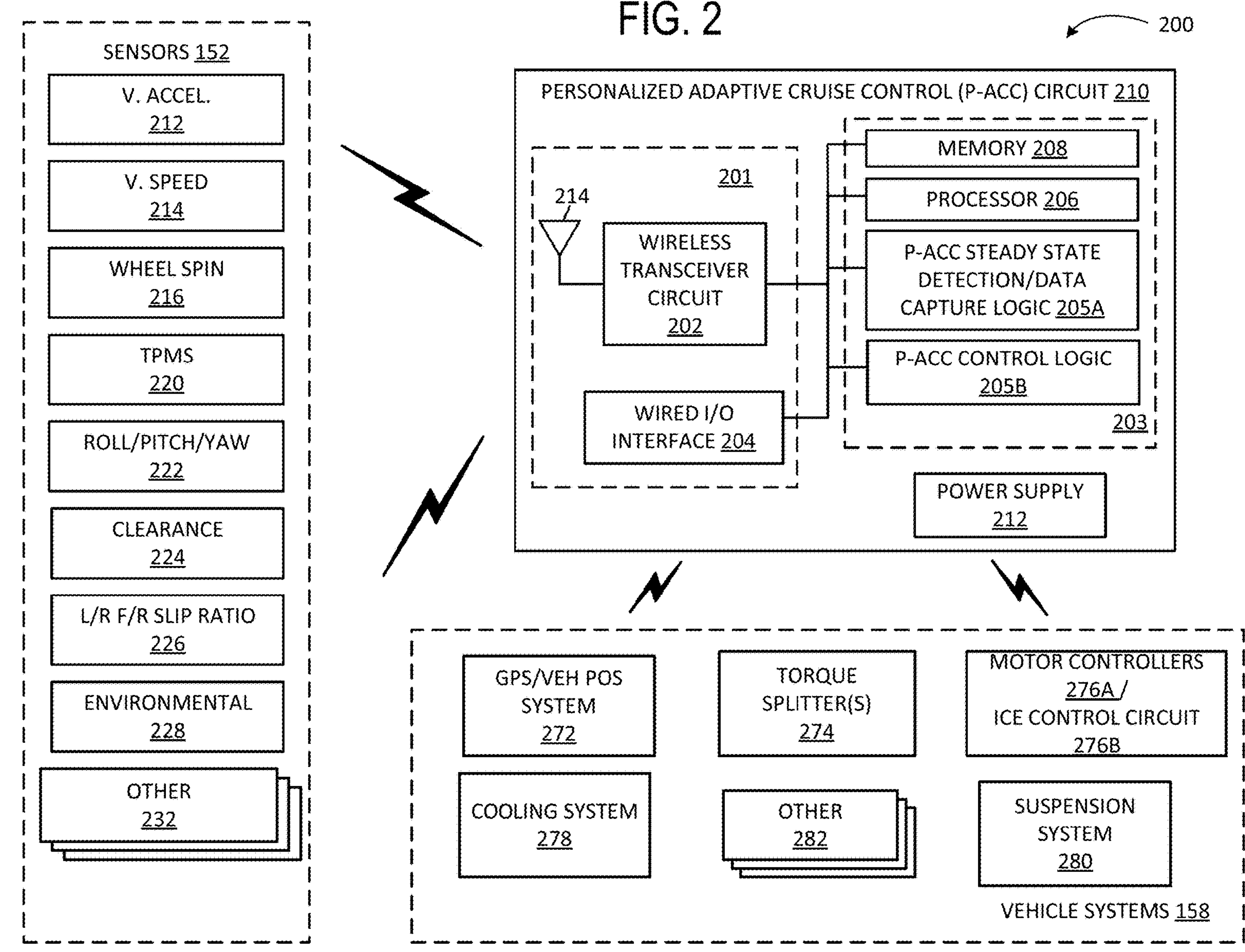
FIG. 2
200
SENSORS 152
V. ACCEL. 212
V. SPEED 214
WHEEL SPIN 216
TPMS 220
ROLL/PITCH/YAW 222
CLEARANCE 224
L/R F/R SLIP RATIO 226
ENVIRONMENTAL 228
OTHER 232
PERSONALIZED ADAPTIVE CRUISE CONTROL (P-ACC) CIRCUIT 210
201
214
WIRELESS TRANSCEIVER CIRCUIT 202
WIRED I/O INTERFACE 204
MEMORY 208
PROCESSOR 206
P-ACC STEADY STATE DETECTION/DATA CAPTURE LOGIC 205A
P-ACC CONTROL LOGIC 205B
203
POWER SUPPLY 212
GPS/VEH POS SYSTEM 272
TORQUE SPLITTER(S) 274
MOTOR CONTROLLERS 276A / ICE CONTROL CIRCUIT 276B
COOLING SYSTEM 278
OTHER 282
SUSPENSION SYSTEM 280
VEHICLE SYSTEMS 158

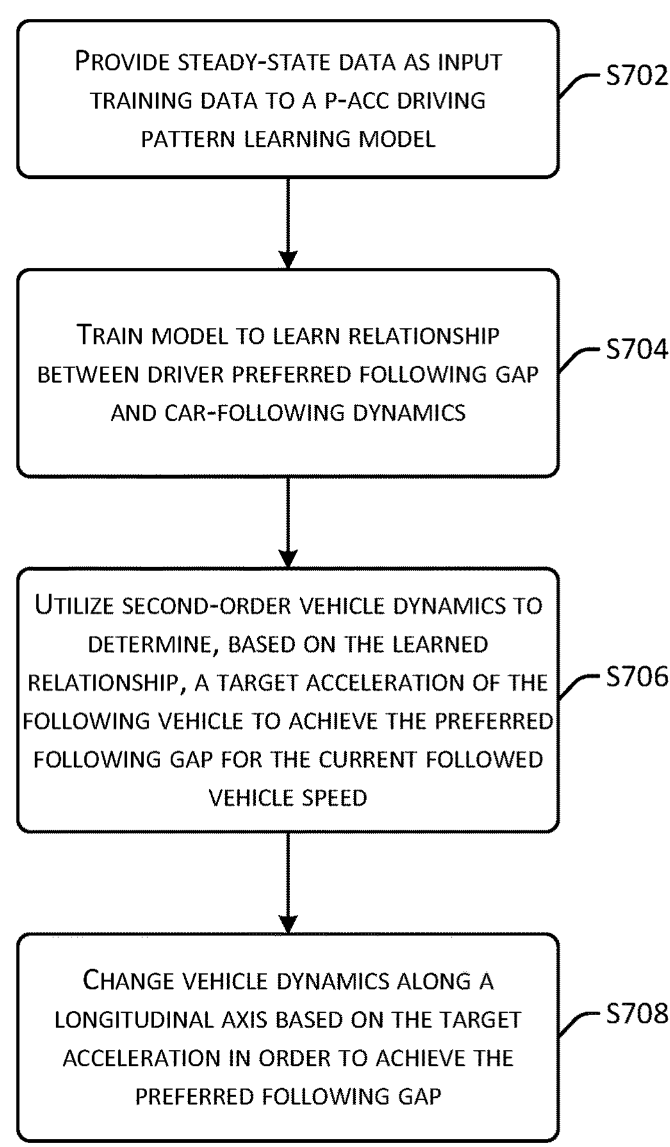
FIG. 7

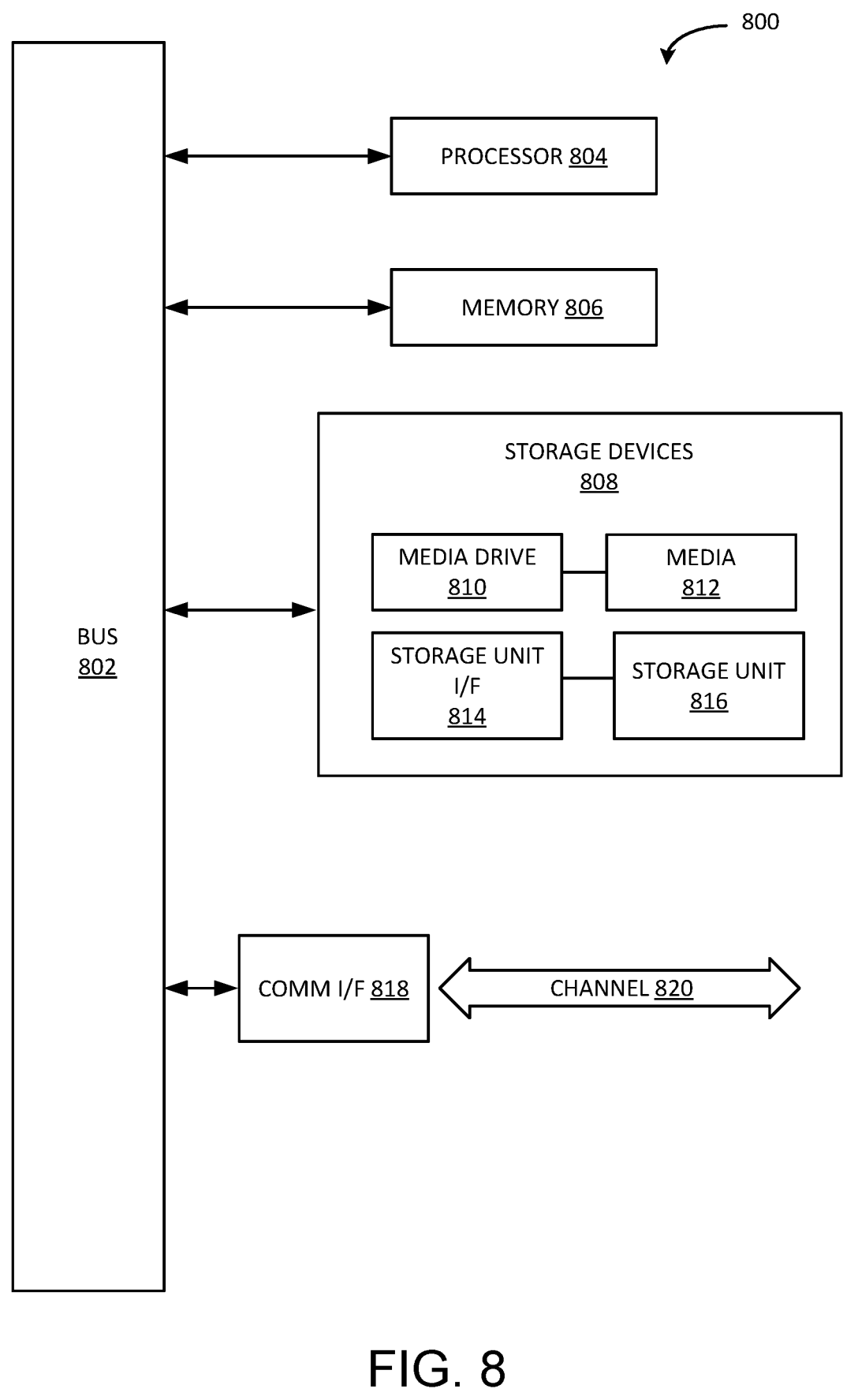

800

PROCESSOR 804

MEMORY 806

STORAGE DEVICES
808

MEDIA DRIVE
810

MEDIA
812

STORAGE UNIT
I/F
814

STORAGE UNIT
816

BUS
802

COMM I/F 818

CHANNEL 820

FIG. 8

PERSONALIZED ADAPTIVE CRUISE CONTROL BASED ON STEADY-STATE OPERATION

TECHNICAL FIELD

The disclosed technology relates generally to personalized adaptive cruise control (ACC) functionality in a vehicle, and more particularly, in some embodiments, to personalizing ACC functionality in a vehicle based on periods of steady-state operation.

DESCRIPTION OF RELATED ART

Adaptive cruise control—also referred to as dynamic cruise control—is a driver-assistance system for road vehicles that automatically adjusts a vehicle speed to maintain a certain following distance from a lead vehicle ahead. In particular, adaptive cruise control systems may utilize various sensing technologies such as radar, laser, and the like to detect a lead vehicle and adjust a following vehicle's speed as necessary to maintain a certain following distance. In some adaptive cruise control systems, the following distance may be one of several preset following distances selectable by a driver.

BRIEF SUMMARY OF THE DISCLOSURE

According to various embodiments of the disclosed technology, systems, methods, computer-readable media, techniques, and algorithms for personalizing adaptive cruise control (ACC) functionality in a vehicle based on periods of steady-state operation are disclosed. In particular, a P-ACC system/algorithm is disclosed that utilizes vehicle dynamics data associated with steady-state operation of the vehicle to train a P-ACC driving pattern machine learning model to learn a relationship between a driver's preferred/desired following gap and vehicle dynamics such as vehicle speed. A P-ACC algorithm according to example embodiments of the disclosed technology innovatively uses vehicle transition states associated with manual interventions of the ACC system (e.g., driver takeover and overwrite events) to identify the periods of vehicle steady-state operation.

In particular, upon detecting a manual intervention of the ACC system, the P-ACC algorithm may wait for the manual intervention to cease and for the ACC system to return to an activated state before determining that the vehicle is operating in a steady state. In some embodiments, the P-ACC algorithm may evaluate steady-state criteria to determine when the vehicle has resumed steady-state operation. For instance, the P-ACC algorithm may determine that the vehicle is operating in a steady state only after a threshold period of time has elapsed since the manual intervention ceased and the ACC system returned to the activated state, without an additional manual intervention occurring during the threshold period of time.

Vehicle dynamics data captured during periods of steady-state operation may be stored as steady-state data. As noted, the steady-state data can be used train a P-ACC driving pattern machine learning model to learn a relationship between a driver's preferred/desired following gap and vehicle dynamics such as vehicle speed. Once the learned relationship is obtained, it can be fed to second-order vehicle dynamics to determine a target vehicle acceleration for achieving a desired following gap based on a lead vehicle's speed, for example. The vehicle may then be controlled to accelerate the vehicle to the target vehicle acceleration, and once the desired following gap is reached, the vehicle may be maintained at a constant speed in order to maintain the following gap. As the lead vehicle's speed changes, the P-ACC algorithm may determine an updated following gap based on the learned relationship, and the vehicle may be accelerated to a target acceleration for achieving the updated following gap.

In an example embodiment of the disclosed technology, a vehicle control system is disclosed that includes a personalized adaptive cruise control circuit, which in turn, includes at least one memory storing machine-executable instructions and at least one processor configured to access the at least one memory and execute the machine-executable instructions to perform a set of operations. The set of operations includes capturing vehicle dynamics data of the vehicle, detecting steady-state operation of a vehicle while an adaptive cruise control (ACC) system of the vehicle is in an activated state, storing the vehicle dynamics data captured during the steady-state operation of the vehicle as steady-state data, and training a personalized ACC driving pattern learning model based on the steady-state data to learn a relationship between a desired following gap and vehicle speed.

In an example embodiment of the disclosed technology, a method for personalizing an adaptive cruise control (ACC) system of a vehicle is disclosed. The method includes detecting steady-state operation of the vehicle while the ACC system of the vehicle is in an activated state, storing vehicle dynamics data captured during the steady-state operation of the vehicle as steady-state data, training a machine learning model using the steady-state data as ground-truth data to learn a relationship between a desired following gap and a vehicle speed, and controlling vehicle dynamics of the vehicle to achieve the desired following gap between the vehicle and a lead vehicle while the ACC system is in the activated state.

In an example embodiment of the disclosed technology, a non-transitory computer-readable medium is disclosed that stores machine-executable instructions that, responsive to execution by at least one processor, cause a set of operations to be performed. The set of operations includes detecting steady-state operation of the vehicle while the ACC system of the vehicle is in an activated state, storing vehicle dynamics data captured during the steady-state operation of the vehicle as steady-state data, training a machine learning model using the steady-state data as ground-truth data to learn a relationship between a desired following gap and a vehicle speed, and controlling vehicle dynamics of the vehicle to achieve the desired following gap between the vehicle and a lead vehicle while the ACC system is in the activated state.

In an example embodiment, detecting the steady-state operation of the vehicle includes detecting a manual intervention of the ACC system, determining that the ACC system has returned to the activated state subsequent to cessation of the manual intervention, determining that a threshold period of time has elapsed since the ACC system returned to the activated state without an additional manual intervention being detected, and determining that the steady-state operation of the vehicle is initiated upon the threshold period of time elapsing.

In an example embodiment, cessation of the manual intervention is detected and the ACC system automatically returns to the activated state responsive to cessation of the manual intervention.

In an example embodiment, the manual intervention is an overwrite event that includes engagement of an accelerator pedal of the vehicle, and detecting cessation of the overwrite event includes detecting a release of the accelerator pedal.

In an example embodiment, the manual intervention of the ACC system is a takeover event that includes engagement of a braking mechanism of the vehicle, and determining that the ACC system has returned to the activated state includes determining that the ACC system has been reactivated subsequent to dis-engagement of the braking mechanism.

In an example embodiment, a first manual intervention of the ACC system is detected, a determination that the steady-state operation of the vehicle has ceased is made responsive to detecting the first manual intervention of the ACC system, and storage of the vehicle dynamics data as the steady-state data is ceased responsive to determining that the steady-state operation of the vehicle has ceased.

In an example embodiment, the ACC system is determined to have returned to the activated state subsequent to cessation of the first manual intervention, a second manual intervention of the ACC system is detected within a threshold period of time since the ACC system returned to the activated state, and vehicle dynamics data captured between a first time at which the ACC system returns to the activated state and a second time at which the second manual intervention is detected is excluded from the steady-state data.

In an example embodiment, the ACC system is determined to have returned to the activated state subsequent to cessation of the second manual intervention, a threshold period of time is determined to have elapsed since the ACC system returned to the activated state subsequent to cessation of the second manual intervention without an additional manual intervention being detected, the steady-state operation of the vehicle is determined to have resumed upon the threshold period of time elapsing, and storage, as the steady-state data, of vehicle dynamics data captured subsequent to the steady-state operation of the vehicle resumes.

In an example embodiment, the ACC system is determined to be in the activated state, a following gap between the vehicle and a lead vehicle is determined to be different from the desired following gap indicated by the learned relationship based on the vehicle speed of at least one of the vehicle or the lead vehicle, a target acceleration for achieving the desired following gap is determined, an accelerator mechanism of the vehicle is controlled to accelerate the vehicle to the target acceleration, and the accelerator mechanism is controlled to cease accelerating the vehicle upon achieving the desired following gap.

In an example embodiment, a manual intervention of the ACC system is detected while the desired following gap is being maintained, the ACC system is determined to have returned to the activated state subsequent to cessation of the manual intervention, steady-state operation of the vehicle is determined to have resumed, the steady-state data is updated with vehicle dynamics data captured after the steady-state operation of the vehicle has resumed, and the ACC driving pattern learning model is re-trained based on the updated steady-state to improve an accuracy of the learned relationship between the desired following gap and the vehicle speed.

In an example embodiment, during the steady-state operation of the vehicle, the vehicle dynamics data includes a speed of the vehicle and a following distance between the vehicle and the lead vehicle.

Any of the above-described aspects and embodiments of the disclosed technology may be combined in any way to obtain additional aspects and embodiments of the disclosed technology. Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 2 illustrates an example vehicle system architecture for implementing personalized adaptive cruise control (P-ACC) functionality based on periods of steady-state vehicle operation in accordance with example embodiments of the disclosed technology.

FIG. 7 is a flowchart of an illustrative method for training a P-ACC driving pattern machine learning model based on ground-truth steady-state data to learn a relationship between a driver-preferred following gap and car-following vehicle dynamics and utilizing the learned relationship in combination with second-order vehicle dynamics to achieve a desired following gap in accordance with example embodiments of the disclosed technology.

FIG. 8 is an example computing component that may be used to implement various features of embodiments of disclosed technology of the disclosed technology.

Figure 1:
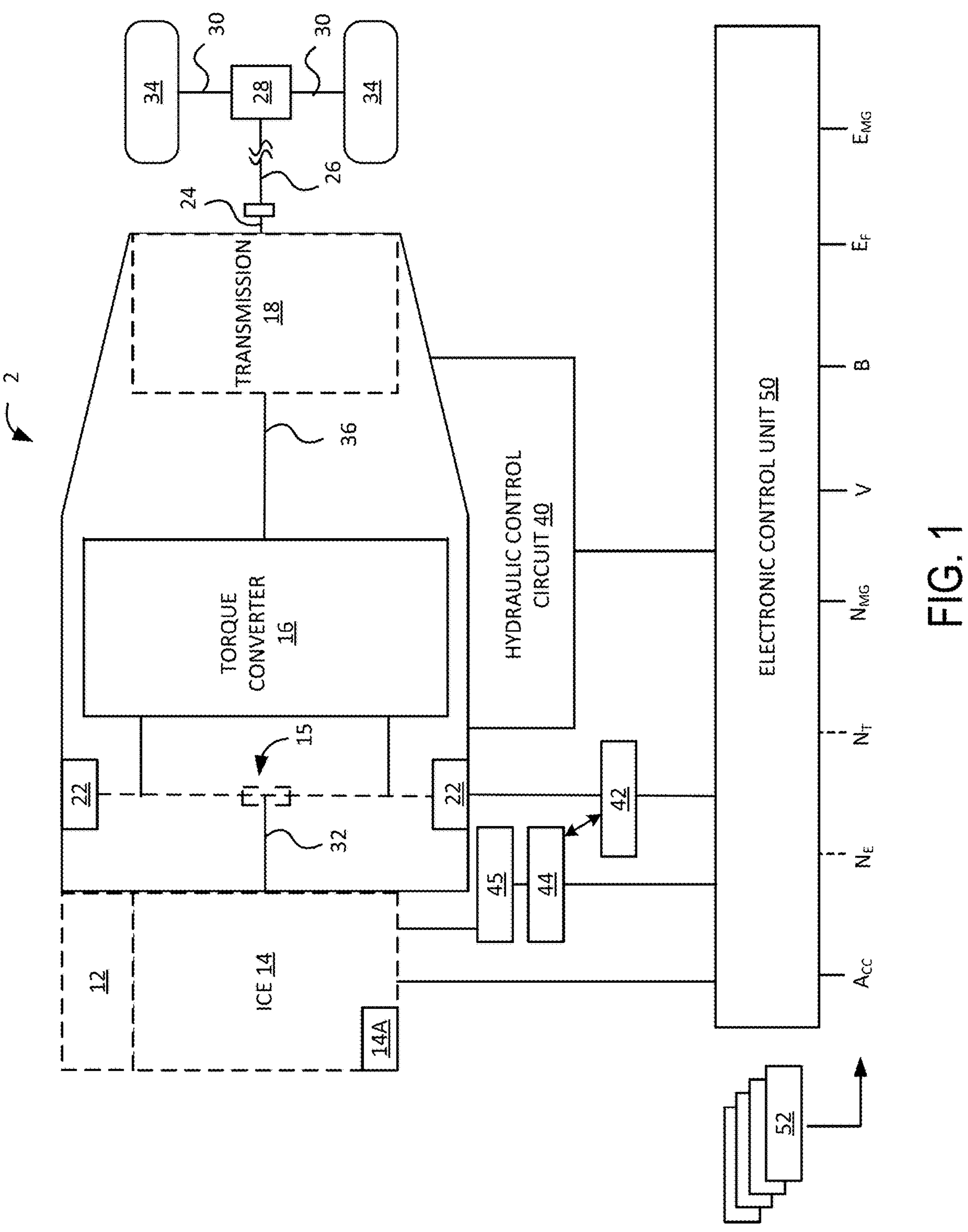
FIG. 1 is a schematic representation of an example hybrid vehicle in which embodiments of the disclosed technology can be implemented.

The figures are not exhaustive and do not limit the present disclosure to the precise form disclosed.

DETAILED DESCRIPTION

Example embodiments of the disclosed technology relate to, among other things, systems, methods, computer-readable media, techniques, and algorithms for personalizing adaptive cruise control (ACC) functionality in a vehicle based on periods of steady-state operation. Some existing ACC systems are capable of a certain degree of personalization. For instance, some existing ACC systems are capable of learning a driver's personalized following gap based on historical trips taken by the driver. These existing personalized ACC systems/algorithms, however, use vast amounts of historical driving trajectory data in an attempt to understand a driver's personal car-following preference, which leads to various technical problems.

In particular, both the accuracy of the driver's learned car-following preference and the learning speed are compromised in existing personalized ACC algorithms that rely on vast amounts of raw vehicle trajectory data. For instance, the raw trajectory data may be contaminated with data representative of vehicle transition states—states in which the vehicle is transitioning to a preferred car-following state but has not yet converged. Use of trajectory data corresponding to such vehicle transition states may reduce the accuracy of the driver's learned car-following preferences because such data is unlikely to represent the driver's actual preferences. In addition, the sheer volume of high-frequency raw trajectory data slows down the learning process significantly, thereby making existing algorithms that rely on such copious amounts of data unsuitable for online application.

A personalized adaptive cruise control (P-ACC) system and algorithm according to various embodiments of the disclosed technology provides technical solutions to the above-described technical problems associated with existing personalized ACC systems. In particular, a P-ACC system/algorithm according to example embodiments of the disclosed technology utilizes only vehicle dynamics data associated with steady-state operation of the vehicle (referred to herein as steady-state data) to train a P-ACC driving pattern machine learning model to learn a relationship between a driver's preferred/desired following gap and vehicle dynamics such as vehicle speed. Steady-state vehicle operation may refer to a state in which a driver intends to remain as long as a preceding vehicle (i.e., a lead vehicle) does not change speed.

Data indicative of periods of steady-state operation can be difficult to identify from raw vehicle trajectory data. A P-ACC algorithm according to example embodiments disclosed herein innovatively uses vehicle transition states associated with driver takeover and overwrite events to identify the periods of vehicle steady-state operation. An overwrite event may refer to a driver engagement of an accelerator mechanism such as depressing an accelerator pedal to manually overwrite the activated ACC system. A takeover event may refer to a driver engagement of a braking mechanism such as depressing a brake pedal. In some embodiments, cessation of an overwrite event (i.e., a driver releasing the accelerator pedal) may automatically return the ACC system to the activated state, while cessation of a takeover event (i.e., a driver releasing the brake pedal) may not, in which case, the driver may be required to manually reactivate the ACC system.

A P-ACC algorithm disclosed herein may detect a manual intervention (e.g., an overwrite event or a takeover event) of an ACC system that is in an activated state. Assuming that the vehicle was operating in a steady-state prior to the manual intervention, the P-ACC algorithm may determine that steady-state operation has ceased upon detecting the manual intervention. In some embodiments, vehicle dynamics data may continue to be captured, but may not be stored as steady-state data during periods of non-steady-state operation. The P-ACC algorithm may then determine that steady-state vehicle operation has resumed upon cessation of the manual intervention, return of the ACC system to the activated state (which, as noted above, may occur automatically in the case of an overwrite event or may require manual reactivation in the case of a takeover event), and satisfaction of other steady-state criteria, such as a threshold period of time elapsing since the ACC system returned to the activated state without an additional manual intervention occurring during the threshold period of time.

Upon determining that steady-state operation of the vehicle has resumed, the P-ACC algorithm may resume storing the captured vehicle dynamics data as steady-state data. In some embodiments, vehicle dynamics data captured since the ACC system returned to the activated state may be stored as steady-state data until another manual intervention of the ACC system is detected. In those embodiments in which another manual intervention is detected within a threshold period of time since the ACC system returned to the activated state after a preceding manual intervention, any vehicle dynamics data captured between when the ACC system returned to the activated state and when the additional manual intervention was detected may be discarded, or retained, but otherwise excluded from the steady-state data used as ground-truth data for training a P-ACC driving pattern machine learning model.

As previously noted, in accordance with example embodiments of the disclosed technology, steady-state data may be used to train a P-ACC driving pattern learning model to learn a relationship between a driver's preferred following gap and vehicle dynamics such as vehicle speed. The steady-state data may include any suitable type of data including, but not limited to, following distance/time gap data (i.e., a distance between a lead vehicle and a following vehicle, which can also be represented as a time gap between the lead vehicle and the following vehicle); vehicle speed of the following vehicle and/or lead vehicle (during steady-state vehicle operation, these vehicle speeds may be the same); vehicle acceleration (which, during steady-state operation, may be zero); and so forth.

Once the learned relationship is obtained, it can be fed to second-order vehicle dynamics to determine a target vehicle acceleration for achieving a desired following gap based on a lead vehicle's speed, for example. The vehicle may then be controlled to accelerate the vehicle to the target vehicle acceleration, and once the desired following gap is reached, the vehicle may be maintained at a constant speed in order to maintain the following gap. As the lead vehicle's speed changes, the P-ACC algorithm may determine an updated following gap based on the learned relationship, and the vehicle may be accelerated to a target acceleration for achieving the updated following gap. It should be appreciated that the target acceleration may be a positive acceleration or a negative acceleration (a deceleration).

A P-ACC system/algorithm in accordance with example embodiments of the disclosed technology solves the technical problems of reduced accuracy and unsuitability for real-time online application associated with existing personalized ACC systems. In particular, by utilizing only steady-state data (i.e., vehicle dynamics data corresponding to periods of steady-state vehicle operation) for training the P-ACC driving pattern machine learning model, the amount of training data is substantially reduced from the full set of raw trajectory data that existing personalization algorithms use, thereby dramatically increasing the learning speed and enabling real-time online incremental learning of the algorithm. In addition, steady-state data is more likely to accurately reflect the driver's true intents/preferences as compared to entire historical driving trajectories which are likely to be contaminated with data relating to vehicle transition states and/or non-car-following events, and as such, training the driving pattern model based on steady-state data alone yields a more accurate learned relationship between the driver's preferred following gap and vehicle speed.

Example embodiments of the disclosed technology provide yet another technical solution to an additional technical problem faced by existing personalized ACC algorithms. In particular, existing ACC algorithms operate in an open-loop setting, where historical data generated by a driver in driving scenarios in which the ACC system is not activated is used to train the longitudinal control algorithms of the ACC system. As such, these existing algorithms fail to consider driver feedback while the ACC system is activated, and thus, fail to adequately learn and refine the driver's car-following preferences over time. In contrast, by utilizing steady-state data associated with periods of steady-state vehicle operation while the ACC is activated, a P-ACC algorithm according to example embodiments of the disclosed technology operates in a closed-loop setting, which in turn, enables the algorithm to continually learn and improve its accuracy as the driver's true intents/preferences become revealed over time by the periods of steady-state operation that follow overwrite/takeover events.

Embodiments of the disclosed technology may be implemented in connection with any of a number of different vehicles including, without limitation, automobiles, trucks, motorcycles, recreational vehicles, or other similar on- or off-road vehicles, and in connection with any of a number of different vehicle types including, without limitation, gasoline-powered vehicles, diesel-powered vehicles, fuel-cell vehicles, electric vehicles, hybrid electric vehicles, or other vehicle types. An example hybrid electric vehicle (HEV) in which embodiments of the disclosed technology may be implemented is illustrated in FIG. 1.

FIG. 1 illustrates a drive system of a vehicle 2 that may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16, a transmission 18, a transmission input shaft 36, a transmission output shaft 24, a propeller shaft 26 coupled to a differential gear device 28, and a pair of axles 30.

As an HEV, vehicle 2 may be driven/powered with either or both of engine 14 and the motor(s) 22 as the drive source. For example, a first travel mode may be an engine-only travel mode that only uses internal combustion engine 14 as the source of motive power. A second travel mode may be an electric-only travel mode that only uses the motor(s) 22 as the source of motive power. A third travel mode may be an HEV travel mode that uses both the engine 14 and the motor(s) 22 as the sources of motive power. In the engine-only and HEV travel modes, vehicle 2 relies on the motive force generated at least by internal combustion engine 14, and a clutch 15 may be included to engage engine 14. In the electric-only travel mode, vehicle 2 is powered by the motive force generated by motor 22 while engine 14 may be stopped and clutch 15 disengaged.

Engine 14 can be an internal combustion engine such as a gasoline, diesel or similarly powered engine in which fuel is injected into and combusted in a combustion chamber. A cooling system 12 can be provided to cool the engine 14 such as, for example, by removing excess heat from engine 14. For example, cooling system 12 can be implemented to include a radiator, a water pump and a series of cooling channels. In operation, the water pump circulates coolant through the engine 14 to absorb excess heat from the engine. The heated coolant is circulated through the radiator to remove heat from the coolant, and the cold coolant can then be recirculated through the engine 14. A fan may also be included to increase the cooling capacity of the radiator. The water pump, and in some instances the fan, may operate via a direct or indirect coupling to the driveshaft of engine 14. In other applications, either or both the water pump and the fan may be operated by electric current such as from battery 44.

An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to command control signal(s) supplied from an electronic control unit 50, described below. Such output control can include, for example, throttle control, fuel injection control, and ignition timing control.

Motor 22 can also be used to provide motive power in vehicle 2 and is powered electrically via a battery 44. Battery 44 may be implemented as one or more batteries or other power storage devices including, for example, lead-acid batteries, lithium ion batteries, capacitive storage devices, and so on. Battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch can be included to engage/disengage the battery charger 45. Battery 44 may also be charged by motor 22 such as, for example, by regenerative braking or by coasting during which time motor 22 operates as a generator.

Motor 22 can be powered by battery 44 to generate a motive force to move the vehicle and adjust vehicle speed. Motor 22 can also function as a generator to generate electrical power such as, for example, when coasting or braking. Battery 44 may also be used to power other electrical or electronic systems in the vehicle. Motor 22 may be connected to battery 44 via an inverter 42. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 may be included and may control the electric drive components of the vehicle as well as other vehicle components. For example, electronic control unit 50 may control inverter 42, adjust driving current supplied to motor 22, and adjust the current received from motor 22 during regenerative coasting and breaking. As a more particular example, output torque of the motor 22 can be increased or decreased by electronic control unit 50 through the inverter 42.

A torque converter 16 can be included to control the application of power from engine 14 and motor 22 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to the motor 22 and torque converter 16 via clutch 15. Clutch 15 can be implemented as, for example, a multiple disc-type hydraulic frictional engagement device whose engagement is controlled by an actuator such as a hydraulic actuator. Clutch 15 may be controlled such that its engagement state is complete engagement, slip engagement, or complete disengagement, depending on the pressure applied to the clutch. For example, a torque capacity of clutch 15 may be controlled according to the hydraulic pressure supplied from a hydraulic control circuit (40). When clutch 15 is engaged, power transmission is provided in the power transmission path between the crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As noted above, vehicle 2 may include an electronic control unit 50. Electronic control unit 50 may include circuitry to control various aspects of the vehicle operation. Electronic control unit 50 may include, for example, a microcomputer that includes one or more processing units (e.g., microprocessors), memory storage (e.g., RAM, ROM, etc.), and I/O devices. The processing units of electronic control unit 50 execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1, electronic control unit 50 receives information from a plurality of sensors included in vehicle 2. For example, electronic control unit 50 may receive signals that indicate vehicle operating conditions or characteristics, or signals that can be used to derive vehicle operating conditions or characteristics. These may include, but are not limited to accelerator operation amount, $A_{CC}$, a revolution speed, $N_E$, of internal combustion engine 14 (engine RPM), a rotational speed, $N_{MG}$, of the motor 22 (motor rotational speed), and vehicle speed, V. These may also include torque converter 16 output, $N_T$ (e.g., output amps indicative of motor output), brake operation amount/pressure, B, battery SOC (i.e., the charged amount for battery 44 detected by an SOC sensor). Accordingly, vehicle 2 can include a plurality of sensors 52 that can be used to detect various conditions internal or external to the vehicle and provide sensed conditions to engine control unit 50 (which, again, may be implemented as one or a plurality of individual control circuits). In one embodiment, sensors 52 may be included to detect one or more conditions directly or indirectly such as, for example, fuel efficiency, $E_F$, motor efficiency, $E_{MG}$, hybrid (internal combustion engine 14+MG 12) efficiency, acceleration, $A_{CC}$, etc.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. Such sensors can be used to detect, for example, other vehicles on a roadway (e.g., a lead vehicle being followed by a vehicle in which the ACC system is activated), traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

The example of FIG. 1 is provided for illustration purposes only as an example of a vehicle system with which embodiments of the disclosed technology may be implemented. One of ordinary skill in the art reading this description will understand how the disclosed embodiments can be implemented with vehicle platforms.

FIG. 2 illustrates an example vehicle system architecture for implementing P-ACC functionality based on periods of steady-state vehicle operation in accordance with example embodiments of the disclosed technology. Referring now to FIG. 2, in this example, a P-ACC system 200 includes a P-ACC circuit 210, a plurality of sensors 152, and a plurality of vehicle systems 158. The P-ACC system 200 may be a particular implementation of a personalized ACC system in accordance with example embodiments of the disclosed technology. Sensors 152 and vehicle systems 158 can communicate with P-ACC circuit 210 via a wired or wireless communication interface. Although sensors 152 and vehicle systems 158 are depicted as communicating with the P-ACC circuit 210, they can also communicate with each other as well as with other vehicle systems. P-ACC circuit 210 can be implemented as an ECU or as part of an ECU such as electronic control unit 50. In other embodiments, P-ACC 210 can be implemented independently of the ECU.

P-ACC circuit 210 in this example includes a communication circuit 201, a decision circuit 203 (including a processor 206 and memory 208 in this example) and a power supply 212. The decision circuit 203 further includes P-ACC steady-state detection/data capture logic 205A and P-ACC control logic 205B. Components of P-ACC circuit 210 are illustrated as communicating with each other via a data bus, although other communication interfaces can be included. Although not depicted, P-ACC circuit 210 may also include a manual assist switch that can be operated by the user to manually select a personalized mode for the ACC system in order to enable its P-ACC functionality.

Processor 206 can include a graphical processing unit (GPU), a central processing unit (CPU), a microprocessor, or any other suitable processing unit/system/chip. The memory 208 may include one or more various volatile and/or non-volatile forms of memory/data storage (e.g., flash memory, random access memory (RAM), etc.) into which the logic 205A and/or the logic 205B can be loaded, along with any data, variables, etc. received as input to the logic 205A and/or logic 205B, in order to be executed by processor 206. In particular, memory 208, can be made up of one or more modules of one or more different types of memory, and may be configured to store data and other information as well as operational instructions that may be used by the processor 206 to enable functionality of the circuit 210.

Although the example of FIG. 2 is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up P-ACC circuit 210.

Communication circuit 201 may be either or both of a wireless transceiver circuit 202 with an associated antenna 214 or a wired I/O interface 204 with an associated hardwired data port (not illustrated). As this example illustrates, communications with P-ACC circuit 210 can occur via wired and/or wireless communications circuits 201. Wireless transceiver circuit 202 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 214 is coupled to wireless transceiver circuit 202 and is used by wireless transceiver circuit 202 to transmit radio frequency (RF) signals wirelessly to wireless equipment with which it is connected and to receive radio signals as well. These RF signals can include information of almost any sort that is sent or received by P-ACC circuit 210 to/from other entities such as sensors 152 and vehicle systems 158.

Wired I/O interface 204 can include a transmitter and a receiver (not shown) for hardwired communications with other devices. For example, wired I/O interface 204 can provide a hardwired interface to other components, including sensors 152 and vehicle systems 158. Wired I/O interface 204 can communicate with other devices using Ethernet or any of a number of other wired communication protocols whether standardized, proprietary, open, point-to-point, networked or otherwise.

Power supply 212 can include one or more of a battery or batteries (such as, e.g., Li-ion, Li-Polymer, NIMH, NiCd, NiZn, and $NiH_2$, to name a few, whether rechargeable or primary batteries,), a power connector (e.g., to connect to vehicle supplied power, etc.), an energy harvester (e.g., solar cells, piezoelectric system, etc.), or it can include any other suitable power supply.

Sensors 152 can include, for example, any of the types of sensors described with respect to sensors 52 depicted in the example of FIG. 1. For instance, the sensors 152 may include inertial sensors (e.g., inertial measurements units (IMUS), accelerometers, gyroscopes, etc.) configured to capture acceleration, velocity/speed, and orientation data; temperature sensors; vibration sensors; sensors configured to capture data relating to the operation of electrical (e.g., battery) and/or mechanical (e.g., powertrain) components of the vehicle; and so forth. The sensor data captured by such sensors 152 may include data indicative of vehicle operating parameters such as position/location data; speed/velocity data; acceleration data; braking data; steering data; and so forth. In some embodiments, sensors 152 may include additional sensors that may or not otherwise be included on a standard vehicle in which the P-ACC system 200 is implemented.

In example embodiments, the sensors 152 may be configured to continuously monitor and capture data relating to an environment, operational parameter, or the like. In some embodiments, a sensor 152 may periodically capture data according to a predetermined schedule (e.g., a sampling rate, a scanning rate of a LiDAR, etc.). In some embodiments, the sensor data may include image data of an environment surrounding a vehicle. The image data of the vehicle's external environment may be captured at a selected frame rate by a collection of cameras. The cameras may be disposed such that different cameras capture image data of different portions of the external environment. In example embodiments, the sensor data reflective of sensed characteristics within a vehicle's external environment may further include three-dimensional (3D) point cloud data captured by a LiDAR, radar data, and the like.

In the illustrated example, sensors 152 include vehicle acceleration sensors 212, vehicle speed sensors 214, wheelspin sensors 216 (e.g., one for each wheel), a tire pressure monitoring system (TPMS) 220, accelerometers such as a 3-axis accelerometer 222 to detect roll, pitch and yaw of the vehicle, vehicle clearance sensors 224, left-right and front-rear slip ratio sensors 226, and environmental sensors 228 (e.g., to detect salinity or other environmental conditions). Additional sensors 232 can also be included as may be appropriate for a given implementation of the P-ACC system 200.

Vehicle systems 158 can include any of a number of different vehicle components or subsystems used to control or monitor various aspects of the vehicle and its performance. In this example, the vehicle systems 158 include a Global Positioning System (GPS) or other vehicle positioning system 272; torque splitters 274 they can control distribution of power among the vehicle wheels such as, for example, by controlling front/rear and left/right torque split; engine control circuits 276 to control the operation of engine (e.g. Internal combustion engine 14); cooling systems 278 to provide cooling for the motors, power electronics, the engine, or other vehicle systems; suspension system 280 such as, for example, an adjustable-height air suspension system, and other vehicle systems 282.

During operation, P-ACC circuit 210 can detect whether the P-ACC system 200 has been activated, in which case, the processor 206 may execute the P-ACC steady-state detection/data capture logic 205A to begin capturing vehicle dynamics data via various vehicle sensors 152 and storing those portions of the vehicle dynamics data that correspond to periods of steady-state operation as steady-state data and discarding or otherwise excluding from the steady-state data vehicle dynamics data captured outside of the steady-state periods of operation. Communication circuit 201 can be used to transmit and receive information between the P-ACC circuit 210 and sensors 152, and the P-ACC circuit 210 and vehicle systems 158. Also, sensors 152 may communicate with vehicle systems 158 directly or indirectly (e.g., via communication circuit 201 or otherwise).

In various embodiments, communication circuit 201 can be configured to receive data and other information from sensors 152 that is used to capture vehicle dynamics data and identify those portions of the vehicle dynamics data that correspond to periods of steady-state operation while the P-ACC system 200 is activated. In example embodiments, upon capturing the steady-state data, the processor 206 may execute the P-ACC control logic 205B to input the captured steady-state data as training data for a P-ACC driving pattern machine learning model to train the model to learn a relationship between a driver-preferred following gap and a vehicle dynamics parameter such as vehicle speed. In some embodiments, the P-ACC driving pattern model and its associated learned relationship may be specific to a particular driver's behavior/preferences. In some embodiments, multiple P-ACC driving pattern models may be trained for an individual driver, where each trained model may relate to a specific driver mood, weather scenario, frequently traveled route, geographic location, terrain, or the like.

It should be appreciated that the logic 205A and/or the logic 205B may be partitioned into two or more engines, program modules, or the like (referred to generically at times hereinafter simply as program module or module). A program module may be a standalone module or a sub-module of another module. Moreover, each module may be implemented in software as computer/machine-executable instructions or code; in firmware; in hardware as hardwired logic within a specialized computing circuit such as an ASIC, FPGA, or the like; or as any combination thereof. It should be understood that any description herein of a module or a circuit performing a particular task or set of tasks encompasses the task(s) being performed responsive to execution of machine-executable instructions of the module and/or execution of hardwired logic of the module.

Additionally, communication circuit 201 can be used to send an activation signal or other activation information to various vehicle systems 158 as part of activating the P-ACC system 200. For example, as described in more detail below, communication circuit 201 can be used to send signals to, for example, one or more of: torque splitters 274 to control front/rear torque split and left/right torque split; motor controllers 276A to, for example, control motor torque, motor speed of the various motors in the system; ICE control circuit 276B to, for example, control power to engine 14 (e.g., to shut down the engine so all power goes to the rear motors, to ensure the engine is running to charge the batteries or allow more power to flow to the motors); cooling system (e.g., 278 to increase cooling system flow for one or more motors and their associated electronics); suspension system 280 (e.g., to increase ground clearance such as by increasing the ride height using the air suspension). The decision regarding what action to take via these various vehicle systems 158 can be made based on the information detected by sensors 152.

Figure 3:
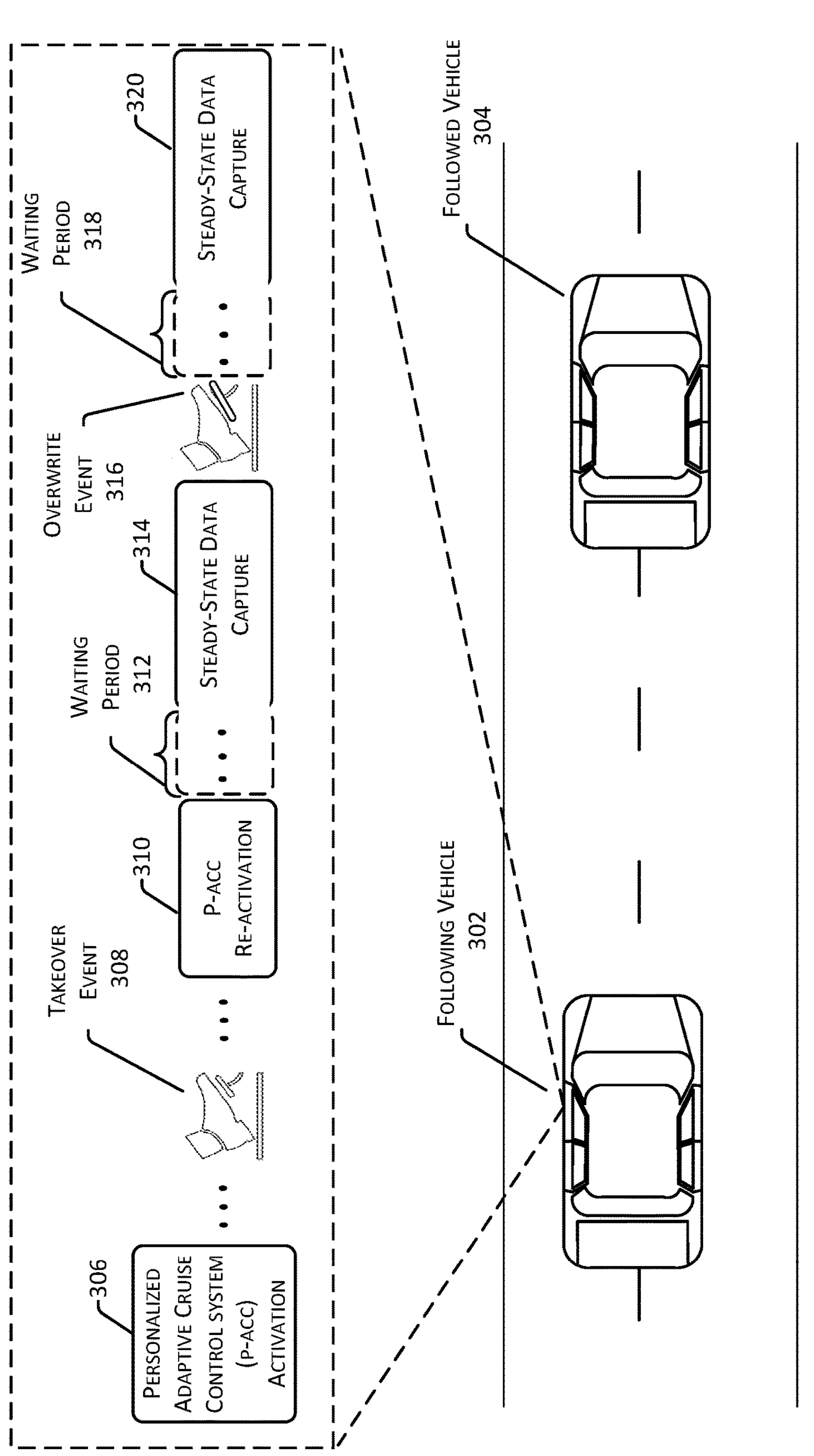
FIG. 3 schematically illustrates detection of periods of steady-state operation of a vehicle while a P-ACC system is activated and capture of steady-state data during the periods of steady-state operation in accordance with example embodiments of the disclosed technology.

Referring now to FIG. 3, a following vehicle 302 and a followed vehicle 304 are depicted. The following vehicle 302 may alternatively be referred to as an ego vehicle and the followed vehicle 304 may alternatively be referred to as a lead/leading vehicle. The vehicles 302, 304 may each be any suitable type of vehicle including, without limitation, automobiles, trucks, motorcycles, recreational vehicles, or other on- or off-road vehicles. In addition, the vehicles 302, 304 may be vehicles that utilize any of a variety of technologies and/or fuel sources for generating motive force including, but not limited to, hybrid electric vehicles, gasoline-powered vehicles, diesel-powered vehicles, fuel-cell vehicles, electric vehicles, or the like. In some example embodiments, the vehicle 302 and/or the vehicle 304 may be an autonomous vehicle capable of fully autonomous operation; a semi-autonomous vehicle capable of performing some but not all vehicle operations autonomously; or the like. In those example embodiments in which the vehicle 302 and/or vehicle 304 is a fully autonomous vehicle, even though a human driver may not be required to operate the vehicle, a safety driver may nonetheless be present to comply with governmental regulations, address safety/liability concerns, and potentially take over control of the vehicle in the event of a vehicle system failure.

A vehicle operator (not depicted) may be present in the vehicle 302 and/or the vehicle 304. The vehicle operator may actively control operation of the vehicle 302/304, or in the scenario in which the vehicle is performing an autonomous/semi-autonomous function (e.g., the ACC system is activated), the vehicle operator may not be actively controlling certain functionality of the vehicle (e.g., longitudinal acceleration), but may be capable of taking over manual control of such functionality at will or in the event of system failure.

The following vehicle 302 may be equipped with the P-ACC system 200 according to embodiments of the disclosed technology. Upon initial activation of the P-ACC system 200 at block 306, the vehicle 302 may be automatically controlled to follow vehicle 304 at a following gap determined according to an initial control strategy, such as that provided by a speed-gap table. If, for example, the driver of vehicle 302 is uneasy with this initial control strategy (e.g., is not comfortable with the current following gap distance), the driver may initiate a manual intervention, which as noted earlier, may be an overwrite event or a takeover event.

A takeover event 308 is illustratively depicted at some time subsequent to activation 306 of the P-ACC system 200. The takeover event 308 may be a driver's engagement of a braking mechanism of the vehicle 302 (e.g., depressing a brake pedal). The driver of vehicle 302 may perform the takeover event 308 if, for example, she is uncomfortable with the following gap being maintained according to the initial control strategy and seeks to increase the following gap. As previously noted, the P-ACC system 200 may transition to a deactivated state responsive to the takeover event 308, and may require manual reactivation 310. In some embodiments, subsequent to the takeover event 308, the driver of vehicle 302 may manually operate the vehicle—which may include any number of additional engagements of the accelerator and/or braking mechanisms of the vehicle 302—until a desired following gap is achieved, at which point, the driver may reactivate 310 the P-ACC system 200.

Responsive to reactivation 310 of the P-ACC system 200, the processor 206 of the P-ACC circuit 210 may execute machine-executable instructions of the P-ACC steady-state detection/data capture logic 205A to initiate a waiting period 312. For instance, the logic 205A may be executed to initiate a timer. The waiting period 312 may be a threshold period of time (which may be driver-configurable or preconfigured by the P-ACC system 200) that the logic 205A waits to ascertain whether the vehicle 302 is in fact in steady-state operation. More specifically, if the logic 205A determines that no additional manual intervention has occurred during the threshold period of time defined by the waiting period 312, or stated another way, that the waiting period 312 has elapsed with no additional manual intervention of the P-ACC system 200 being detected since reactivation 310 of the P-ACC, then the logic 205A determines that the vehicle is in steady-state operation and initiates steady-state data capture 314.

To initiate the steady-state data capture 314, the processor 206 of the P-ACC circuit 210 may execute the logic 205A to store vehicle dynamics data captured since reactivation 310 of the P-ACC system 200 as steady-state data to be used to train a P-ACC driving pattern model for the driver of vehicle 302. The logic 205A may continue capturing and storing the vehicle dynamics data as steady-state data until a subsequent manual intervention (e.g., an overwrite event 316) is detected, at which point, the logic 205A may determine that vehicle 302 is no longer in steady-state operation and may cease the steady-state data capture 314.

It should be appreciated that the P-ACC circuit 210 may continue to store vehicle dynamics data captured by various ones of the sensors 152 when the vehicle 302 is not in steady-state operation, but may exclude such data from the steady-state data to be used as training data. In some embodiments, vehicle dynamics data captured during the waiting period 312 may be initially excluded from the steady-state data, but may later be included in the steady-state data upon determining that no additional manual intervention was detected during the waiting period 312. In other embodiments, if an additional manual intervention does occur during the waiting period 312, then the steady-state data capture 314 may not be initiated, and any vehicle dynamics data captured during the waiting period 312 may be permanently excluded from the steady-state data, and either retained for other purposes and discarded entirely. This potential use or exclusion of the vehicle dynamics data captured during the waiting period 312 is indicated by the use of dashed lines. More generally, in some embodiments, any vehicle dynamics data captured during any time period that is confirmed to be a period of non-steady-state vehicle operation is excluded from the steady-state data and either discarded or retained for other calculations unrelated to the training of a P-ACC driving pattern machine learning model.

As noted earlier, an overwrite event 316 is illustratively depicted in FIG. 3. The overwrite event 316 may occur when a driver of vehicle 302 engages an accelerator mechanism of the vehicle 302 (e.g., depresses an accelerator pedal). As previously described, if, for example, the overwrite event 316 occurs during the waiting period 312, then the steady-state data capture 314 may not be initiated at all, and any vehicle dynamics data captured between when the P-ACC system 200 was reactivated and when the overwrite event 316 is detected may be discarded or otherwise excluded from the steady-state data. Assuming, however, that the overwrite event 316 does not occur during the waiting period 312, and the steady-state data capture 314 is initiated, then upon detecting the overwrite event 316, the P-ACC steady-state detection/data capture logic 205A may determine that steady-state operation of the vehicle 302 has ceased, and may cease the steady-state data capture 314.

As previously noted, upon cessation of the overwrite event 316 (e.g., release of the accelerator pedal), the P-ACC system 200 may automatically return to the activated state. Responsive to return of the P-ACC system 200 to the activated state, the processor 206 of the P-ACC circuit 210 may execute machine-executable instructions of Similar to the waiting period 312, the waiting period 318 may be a threshold period of time (which may be driver-configurable or preconfigured by the P-ACC system 200) that the logic 205A waits to ascertain whether the vehicle 302 has, in fact, returned to steady-state operation. In particular, if the logic 205A determines that no additional manual intervention has occurred during the threshold period of time defined by the waiting period 318, or stated another way, that the waiting period 318 has elapsed with no additional manual intervention of the P-ACC system 200 being detected since return of the P-ACC system 200 to the activated state, then the logic 205A determines that the vehicle is in steady-state operation and initiates steady-state data capture 320. The duration of the waiting period 318 may be the same as or different from the duration of the waiting period 312. Earlier discussion regarding vehicle dynamics data capture during the waiting period 312, and whether such data is ultimately included in the steady-state data based on whether the vehicle 302 is confirmed to be operating in a steady-state with no additional manual intervention occurring during the waiting period 318, is equally applicable to the waiting period 318 that follows the cessation of the overwrite event 316 and return of the P-ACC system 200 to the activated state.

Figure 4:
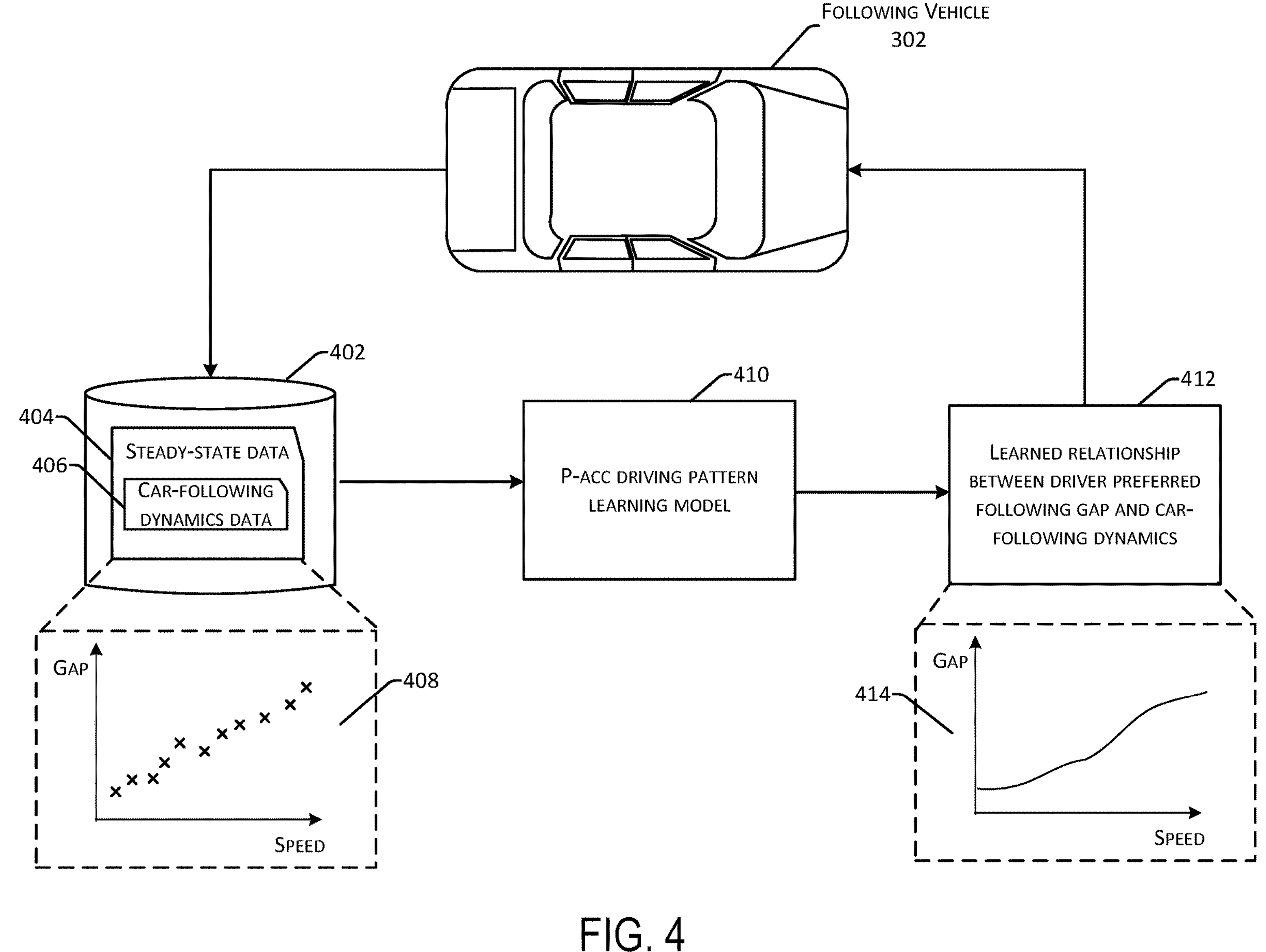
FIG. 4 schematically illustrates training a P-ACC driving pattern machine learning model based on ground-truth steady-state data to learn a relationship between a driver-preferred following gap and car-following vehicle dynamics in accordance with example embodiments of the disclosed technology.

Referring now to FIG. 4, training of a P-ACC driving pattern machine learning model based on ground-truth steady-state data is illustratively depicted. Steady-state data 404 is shown as being stored in one or more datastores 402. The steady-state data 404 may include car-following vehicle dynamics data 406 captured during periods of steady-state operation of the vehicle 302. The car-following vehicle dynamics data 406 may include, without limitation, acceleration data for the following vehicle 302 and/or the followed vehicle 304; velocity/speed data for the following vehicle 302 and/or the followed vehicle 304; following gap distance data indicative of distance headway between the followed vehicle 304 and the following vehicle 302; and so forth. For instance, the car-following vehicle dynamics data 406 may include a set of data points 408 indicative of following gaps maintained at different vehicle speeds during periods of steady-state operation of the vehicle 302.

In some embodiments, an onboard ECU of the vehicle 302 (e.g., ECU 50) may include the datastore(s) 402 storing the steady-state data 404. The steady-state data 404 may be updated in real-time as new vehicle dynamics data 406 is captured during periods of vehicle steady-state operation. The steady-state data 404 is significantly less noisy than raw trajectory data because it does not include data corresponding to periods of non-steady-state operation such as vehicle transition states and/or non-car following states. Further, because the steady-state data 404 excludes vehicle dynamics data corresponding to periods of non-steady-state operation, it is more storage efficient.

In some embodiments, the steady-state data 404 may be specific to a particular driver. That is, distinct steady-state data may be captured and stored for each driver. In some embodiments, a particular driver may be identified based on some form of user authentication (e.g., biometrics, username/password, etc.) and a corresponding user profile for the driver may be accessed to, in turn, access the steady-state data for that driver. Alternatively, a driver may be prompted to select their user profile from available profiles upon activation of the P-ACC system 200.

In some embodiments, the steady-state data 404 may be fed as input training data to a P-ACC driving pattern machine learning model 410 to learn a relationship 412 between a driver-preferred following gap and car-following vehicle dynamics such as vehicle speed. The learned relationship is illustratively depicted in plot 414. In some embodiments, the P-ACC driving pattern learning model 410 may be a Gaussian mixture model (GMM), which is trained as a joint probability distribution of following gap, velocity, and other vehicle states, as representing in the steady-state training data 404.

In example embodiments, the linear combination of Gaussian distributions of the GMM model 410 is given by the following equation:

$$p(x) = \sum_{i=1}^{M} \pi_i p(x \mid \mu_i, \sigma_i), \quad \text{(Eq. 1)}$$

where M is the number of Gaussian distributions, and $\pi_i$ is the weight of the ith component of a multivariate Gaussian distribution. The relationship 412 between the driver's preferred following gap and the car-following vehicle dynamics (e.g., speed/acceleration of the following vehicle 302; speed/acceleration of the followed vehicle 304) may then be calculated based on the learnt distribution of the GMM model 410 using the maximum likelihood principle, for example. Because the amount of steady-state data 404 is substantially less than the raw vehicle trajectory data, the GMM learning process is very fast, thereby enabling the control strategy of the P-ACC system 200 to be updated in real-time while driving.

Figure 5:
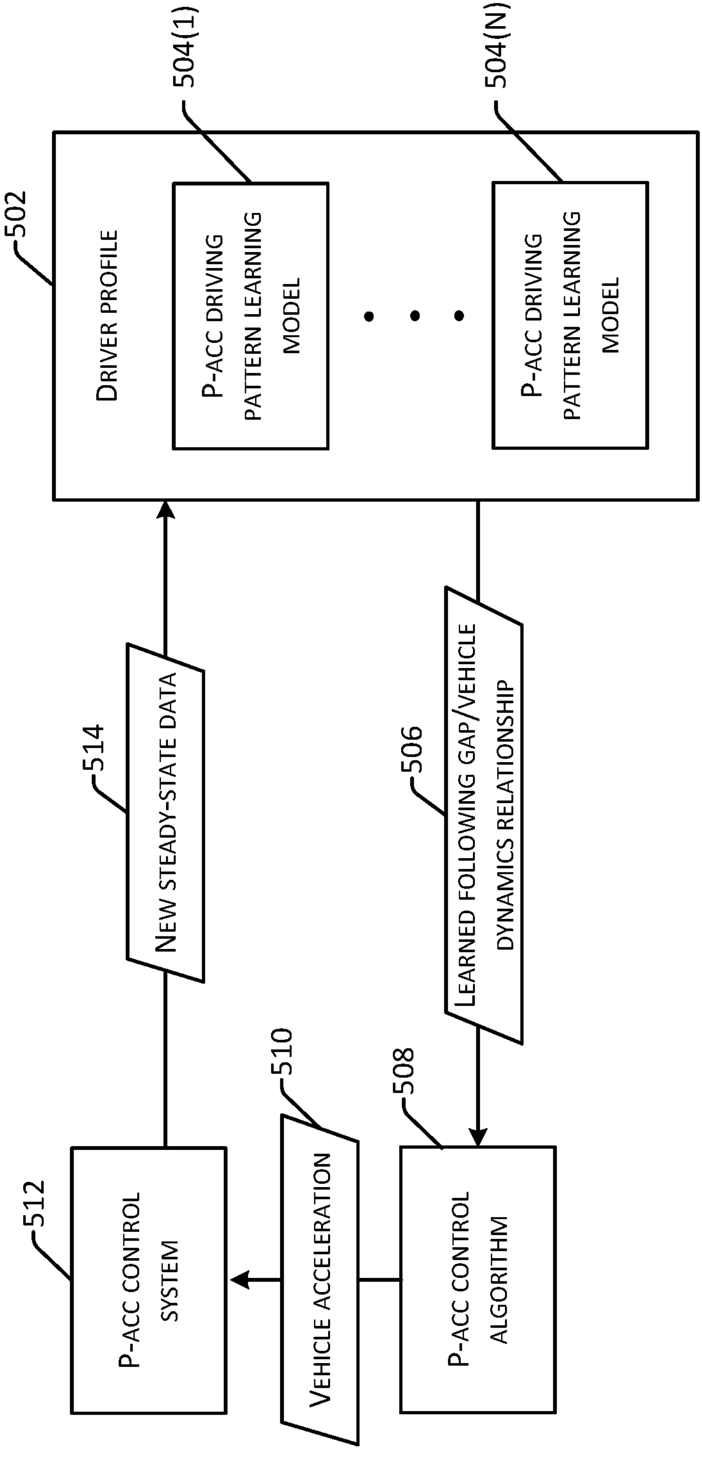
FIG. 5 schematically illustrates utilizing the learned relationship between the driver-preferred following gap and the car-following vehicle dynamics in combination with second-order vehicle dynamics to determine a target vehicle acceleration for achieving a desired following gap in accordance with example embodiments of the disclosed technology.

Once the learned relationship 412 is obtained from the model 410, it can be fed into second-order vehicle dynamics to determine a target acceleration for the P-ACC system 200 to achieve the desired following gap given current vehicle speed. This is illustratively depicted in FIG. 5. An example driver profile 502 is depicted, which may be specific to a particular driver. In some embodiments, the driver profile 502 may contain multiple P-ACC driving pattern learning models 504(1)-504(N) for the particular driver (generically referred to herein as P-ACC driving pattern learning model 504). Each learning model 504 may be specific to a particular driving scenario, thereby accounting for the possibility that a driver's preferred following gap may vary for a given vehicle speed depending on the driving environment.

For instance, a driver's preferred following gap may vary based on weather conditions (e.g., a driver may prefer a larger following gap at a given speed in rainy, snowy, icy, foggy, or other hazardous driving conditions); traffic conditions (e.g., a driver may prefer a smaller following gap at a given speed in high-traffic conditions); time-of-day (e.g., a driver may prefer a larger following gap at a given speed during daylight hours as compared to nighttime driving during which visibility may be poor); route being travelled (e.g., a driver may prefer a smaller following gap for a route that he frequently travels as compared a new/unfamiliar route); and so forth. In some embodiments, different learning models 504 may be provided for different driver moods/driving modes. For instance, a driver may select a "rush mode" that corresponds to a learning model 504 that produces a smaller following gap at a given speed as compared to a "leisure mode" indicative of the driver's preference for a more casual driving experience in which a larger following gap is maintained at a given speed. Regardless of the particular driving conditions, the relationship between following gap and car-following vehicle dynamics obtained from the model 504 corresponding to those driving conditions may be learned over time based on vehicle dynamics data captured during periods of steady-state operation.

In example embodiments, a learned relationship 506 obtained from a particular selected P-ACC driving pattern learning model 504 may be inputted to a P-ACC longitudinal control algorithm 508 to determine a target acceleration 510 for the vehicle 302. For instance, given second-order vehicle dynamics $\dot{r}_i(t)=v_i(t)$ (Eq. 2) and $\dot{r}_i(t)=a_i(t)$ (Eq. 3), where $r_i(t)$, $v_i(t)$, and $a_i(t)$ denote longitudinal position, longitudinal speed, and longitudinal acceleration of vehicle i at time t, respectively, the control algorithm 508 may be a consensus algorithm for calculating the desired target acceleration 510 of the following vehicle (e.g., vehicle 302).

In example embodiments, the control algorithm 508—which may be a double-integrator distributed consensus algorithm—can be formulated as a car-following problem, where given $l_l$ and $l_j$ (denoting the length of the following (ego) vehicle i and the followed (front/leading) vehicle j, respectively), and $r_i(0)$, $v_i(0)$, $a_i(0)$, $r_i(0)$, $v_j(0)$, $a_j(0)$, the ego vehicle is longitudinally controlled such that $r_i(t) \to r_j(t) - r_{headway}$ (Eq 4), $v_i(t) \to v_j(t)$ (Eq. 5), and $a_i(t) \to a_{j1}(t)$ (Eq. 6), where "→" indicates that the value on the left-hand side converges to the value on the right-hand side, and $r_{headway}$ is the desired distance headway (i.e., following gap) between vehicle i and vehicle j.

In some embodiments, some modifications may be needed to adapt the above-described consensus algorithm to the car-following scenario. In particular, in a standard formulation of the consensus algorithm, the desired position between the two agents is zero, i.e., $r_i(t) \to r_j(t) \to 0$. However, in a car-following scenario, the position difference between vehicle i and vehicle j does not converge to 0, but rather to $r_{headway}$. In addition, the standard formulation of the consensus algorithm does not consider delay, whereas the actuation delay in ACC systems is generally non-negligible.

Accordingly, in example embodiments, the longitudinal P-ACC control algorithm 508 is given by the following equations:

$$\dot{r}_i(t) = v_i(t) \text{ and} \quad \text{(Eq. 7)}$$

$$\dot{v}_i(t) = -a_{ij}k_{ij} \cdot \Big[\big(r_i(t) - r_j(t - \tau_{ij}(t)) + l_j + v_i(t) \cdot \big(t_{ij}^g(t) + \tau_{ij}(t)\big)\big) + \gamma_i \cdot \big(v_i(t) - v_j(t - \tau_{ij}(t))\big)\Big], i, j \in \mathcal{H}\big), \quad \text{(Eq. 8)}$$

where $\tau_{ij}(t)$ denotes the time-variant actuation delay. In example embodiments, $$t_{ij}^g(t)$$

represents the driver-preferred time-variant time gap between the ego vehicle i and the lead vehicle j, whose value is correlated to the driver-preferred following gap, which is determined based on the learned relationship 506.

In example embodiments, the output of the P-ACC longitudinal control algorithm 508, i.e., the target acceleration 510 given by $\dot{v}_i(t)$ may be inputted to a P-ACC controller 512 (which may form part of the P-ACC system 200) to change the vehicle dynamics of the ego vehicle i along the longitudinal axis to accelerate the vehicle to the target acceleration 510 and achieve the desired following gap given the current speed of vehicle j. Once the desired following gap is reached, vehicle i may be maintained at constant speed to maintained the following gap (as long as the speed of vehicle j does not change).

In some embodiments, the value of $$t_{ij}^g(t)$$

may be incrementally updated as new steady-state data 514 is obtained as a result of additional manual interventions (overwrite and/or takeover events) that occur. That is, as additional manual interventions occur, new periods of steady-state operation of the vehicle i also occur between the manual interventions, and steady-state data 514 reflective of these new periods of steady-state operation may be fed back into a P-ACC driving pattern learning model 504 to incrementally refine the model and adjust the learned relationship 506 between the driver-preferred following gap and car-following vehicle dynamics.

Figure 6A:
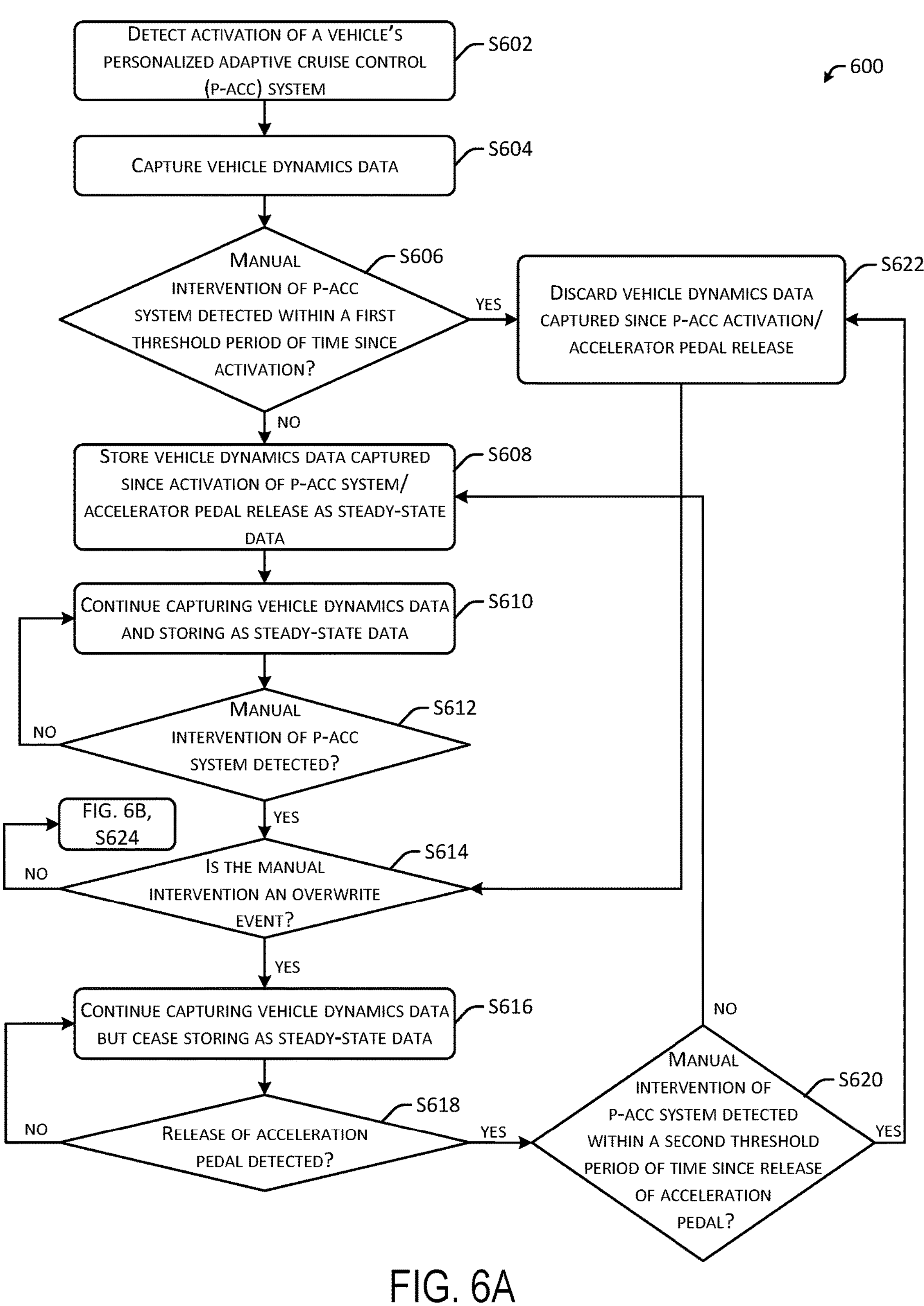
FIGS. 6A and 6B are flowcharts of an illustrative method for detecting periods of steady-state operation of a vehicle while a P-ACC system is activated and capturing steady-state data during the periods of steady-state operation in accordance with example embodiments of the disclosed technology.
Figure 6B:
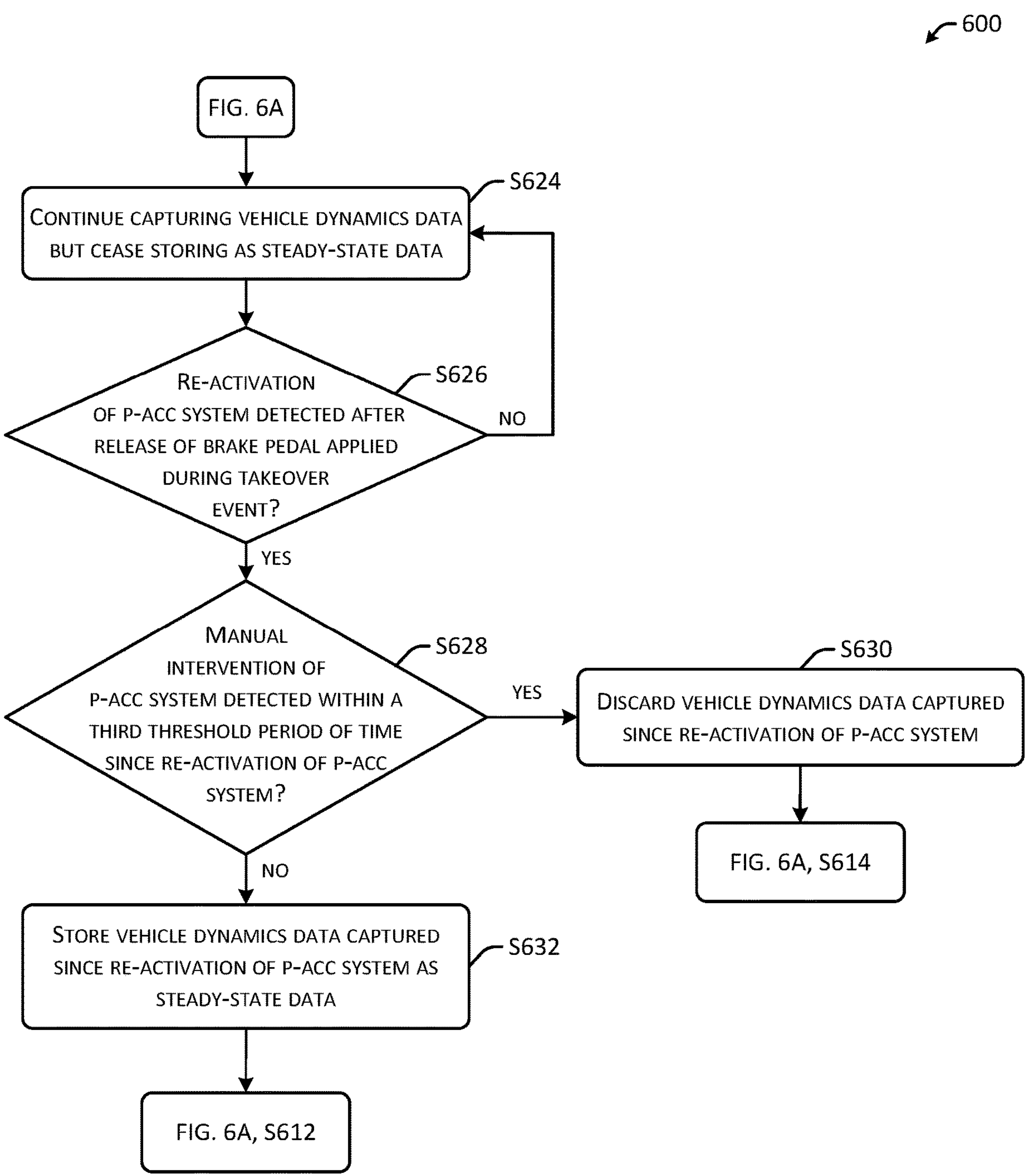

Example methods according to embodiments of the disclosed technology, which are depicted in the flowcharts of FIGS. 6A, 6B, and 7, will now be described. FIGS. 6A and 6B are flowcharts of an illustrative method 600 for detecting periods of steady-state operation of a vehicle while a P-ACC system is activated and capturing steady-state data during the periods of steady-state operation. FIG. 7 is a flowchart of an illustrative method 700 for training a P-ACC driving pattern machine learning model based on ground-truth steady-state data to learn a relationship between a driver-preferred following gap and car-following vehicle dynamics and utilizing the learned relationship in combination with second-order vehicle dynamics to achieve a desired following gap. In example embodiments, the methods 600 and 700 may be performed by the P-ACC circuit 210 of the P-ACC system 200. More specifically, the method 600 may be performed responsive to the processor 206 executing machine-executable instructions of the P-ACC steady-state detection/data capture logic 205A, while the method 700 may be performed responsive to the processor 206 executing the P-ACC control logic 205B.

The P-ACC system 200 is referred to herein as being in either an activated state or a deactivated/inactivated state. It should be appreciated that the P-ACC system being in an activated state refers to a state in which the automatic car-following functionality of the P-ACC system that does not require human driver accelerator input is enabled, and the inactivated (or deactivated state) refers to a state in which such automatic car-following functionality of the P-ACC system is not enabled, i.e., manual accelerator pedal input is required. It should be appreciated, however, that even if in the deactivated/inactivated state, the P-ACC system may nonetheless continue to execute the logic 205A and the logic 205B.

Referring first to FIG. 6A, at block S602, activation of a following (ego) vehicle's P-ACC system (e.g., P-ACC system 200) is detected. In some embodiments, this may be a driver's initial activation of the P-ACC system. At block S604, vehicle dynamics data capture may be initiated. At block S606, it is determined whether there has been a manual intervention of the P-ACC system within a first threshold period of time since activation was detected at block S602. In response to a positive determination at block S606, it is determined that the ego vehicle is not in steady-state operation, and vehicle dynamics data captured since activation of the P-ACC system was detected at block S602 is discarded, or otherwise excluded from the steady-state data to be used to train a P-ACC driving pattern learning model.

On the other hand, in response to a negative determination at block S606, vehicle dynamics data captured since activation of the P-ACC system is stored as steady-state data at block S608, and vehicle dynamics data continues to be captured and stored as steady-state data at block S610 as long as a manual intervention is not detected at block S612. In some embodiments, the P-ACC system may continuously monitor for a manual intervention (the determination at block S612), and as long as a negative determination is made at block S612, the P-ACC system may continue capturing and storing vehicle dynamics data as steady-state data at block S610.

In response to detection of a manual intervention at block S612, a determination is made at block S614 as to whether the manual intervention is an overwrite event. If the manual intervention is determined to be an overwrite event, the P-ACC system may continue capturing the vehicle dynamics data at block S616, but may cease storing the captured data as steady-state data as long as the overwrite event is in progress. That is, the P-ACC system may determine whether cessation of the overwrite event has occurred by determining, at block S618, whether the accelerator pedal has been released, and as long as a negative determination is made at block S618, the P-ACC system may refrain, at block S616, from storing captured vehicle dynamics data as steady-state data. Alternatively, the P-ACC system may cease capturing vehicle dynamics data altogether while a manual intervention is in progress (or more generally while the P-ACC system is in an inactivated state).

In response to a positive determination at block S618, i.e., release of the accelerator pedal is detected thereby indicating a cessation of the overwrite event, and in some embodiments, automatic return of the P-ACC system to the activated state a determination is made at block S620 as to whether an additional manual intervention of the P-ACC system is detected within a second threshold period of time (e.g., the waiting period 318) since the P-ACC system returned to the activated state subsequent to cessation of the overwrite event (which may coincide with release of the accelerator pedal in those scenarios in which the P-ACC system automatically returns to the activated state upon cessation of the overwrite event). In response to a positive determination at block S620, vehicle dynamics data captured since return of the P-ACC system to the activated state (e.g., since release of the accelerator pedal) may be discarded, or otherwise excluded from the steady-state data. On the other hand, in response to a negative determination at block S620, vehicle dynamics data captured since return of the P-ACC system to the activated state (e.g., since release of the accelerator pedal) may be stored as steady-state data, and the P-ACC system may continue capturing vehicle dynamics data and storing the captured data as steady-state data until a next manual intervention of the P-ACC system is detected.

Returning again to block S614, if the detected manual intervention is not an overwrite event, i.e., a negative determination at block S614, it is determined that the manual intervention is a takeover event, and the method 600 proceeds to block S624. Referring now to FIG. 6B, upon detecting the takeover event, the P-ACC system determines that the ego vehicle is no longer in steady-state operation, and may continue capturing the vehicle dynamics data at block S624, but does not store the captured data as steady-state data.

Then, at block S626, it is determined whether the P-ACC system has been reactivated after cessation of the takeover event, i.e., after release of the brake pedal. As previously noted, the P-ACC system—which is deactivated responsive to the takeover event—may need to manual reactivated by the driver. As long as the P-ACC remains in the deactivated state, vehicle dynamics data capture may be ceased altogether, or even if not ceased, any such data that is captured at block S624 is not stored as steady-state data.

If a return to the activated state, i.e., reactivation of the P-ACC system after cessation of the takeover event, is detected (a positive determination at block S626), then a determination is made at block S628 as to whether an additional manual intervention of the P-ACC system is detected within a third threshold period of time (e.g., waiting period 312) since the P-ACC system was reactivated. If an additional manual intervention is detected at block S628 (takeover or overwrite event), vehicle dynamics data captured since reactivated of the P-ACC system may be discarded, or otherwise excluded from the steady-state data, at block S630. The method 600 may then return to block S614 from block S630. On the other hand, if no additional manual intervention is detected during the third threshold period of time, then vehicle dynamics data captured since reactivation of the P-ACC system may be stored as steady-state data at block S632. The method 600 may then return to block S612 from block S632.

As steady-state data continues to be captured and stored, a P-ACC driving pattern machine learning model may be continuously trained and re-trained based on the steady-state data in real-time. In some embodiments, initial training of the model may not begin until some threshold amount of steady-state data is available. Referring now to FIG. 7, at block S702, steady-state data may be provided as input training data to a P-ACC driving pattern learning model. As previously described, the P-ACC driving pattern learning model may be specific to a particular driver, and in some embodiments, specific to a particular driving scenario for the particular driver.

At block S704, the P-ACC driving pattern machine learning model may be trained based on the steady-state data to learn a relationship between a driver-preferred following gap and car-following dynamics such as lead vehicle speed and/or ego vehicle speed. At block S706, the relationship learned at block S704 may be fed into second-order vehicle dynamics to determine a target acceleration for the ego vehicle in order to achieve the preferred following gap for the current speed of the lead vehicle.

At block S708, vehicle dynamics of the ego vehicle are changed to accelerate the ego vehicle to the target acceleration in order to achieve the desired following gap. Once the desired following gap is achieved, the ego vehicle may be maintained at a constant speed matching the lead vehicle's speed. If the lead vehicle's speed changes, the longitudinal dynamics of the ego vehicle may be updated to a different target acceleration in order to achieve a different following gap for the new lead vehicle speed, as dictated by the learned relationship. Further, in some embodiments, as new manual interventions occur, new periods of steady-state operation also occur, and corresponding steady-state data may be stored and fed into the model to re-train the model to update/refine the learned relationship.

As used herein, the terms circuit and component might describe a given unit of functionality that can be performed in accordance with one or more embodiments of the disclosed technology. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 8. After reading this description, it will become apparent to a person skilled in the relevant art how to implement the application using other computing components or architectures.

Referring now to FIG. 8, computing component 800 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 800 might also represent computing capabilities embedded within or otherwise available to a given device. For example, a computing component might be found in other electronic devices such as, for example, portable computing devices, and other electronic devices that might include some form of processing capability.

Computing component 800 might include, for example, one or more processors, controllers, control components, or other processing devices. This can include a processor 804, the processor 206 (FIG. 2), or the like. Processor 804 might be implemented using a general-purpose or special-purpose processing engine such as, for example, a microprocessor, controller, or other control logic. Processor 804 may be connected to a bus 802. However, any communication medium can be used to facilitate interaction with other components of computing component 800 or to communicate externally.

Computing component 800 might also include one or more memory components, simply referred to herein as main memory 806, which may, in example embodiments, include the memory 208 (FIG. 2). For example, random access memory (RAM) or other dynamic memory, might be used for storing information and instructions to be executed by processor 804. Main memory 806 might also be used for storing temporary variables or other intermediate information during execution of instructions to be executed by processor 804. Computing component 800 might likewise include a read only memory ("ROM") or other static storage device coupled to bus 802 for storing static information and instructions for processor 804.

The computing component 800 might also include one or more various forms of information storage 808, which might include, for example, a media drive 810 and a storage unit interface 814. The media drive 810 might include a drive or other mechanism to support fixed or removable storage media 812. For example, a hard disk drive, a solid-state drive, a magnetic tape drive, an optical drive, a compact disc (CD) or digital video disc (DVD) drive (R or RW), or other removable or fixed media drive might be provided. Storage media 812 might include, for example, a hard disk, an integrated circuit assembly, magnetic tape, cartridge, optical disk, a CD or DVD. Storage media 812 may be any other fixed or removable medium that is read by, written to or accessed by media drive 810. As these examples illustrate, the storage media 812 can include a computer usable storage medium having stored therein computer software or data.

In alternative embodiments, information storage mechanism 808 might include other similar instrumentalities for allowing computer programs or other instructions or data to be loaded into computing component 800. Such instrumentalities might include, for example, a fixed or removable storage unit 816 and an interface 814. Examples of such storage units 816 and interfaces 814 can include a program cartridge and cartridge interface, a removable memory (for example, a flash memory or other removable memory component) and memory slot. Other examples may include a PCMCIA slot and card, and other fixed or removable storage units 816 and interfaces 814 that allow software and data to be transferred from storage unit 816 to computing component 800.

Computing component 800 might also include a communications interface 818. Communications interface 818 might be used to allow software and data to be transferred between computing component 800 and external devices. Examples of communications interface 818 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 818 may be carried on signals, which can be electronic, electromagnetic (which includes optical) or other signals capable of being exchanged by a given communications interface 818. These signals might be provided to communications interface 818 via a channel 820. Channel 820 might carry signals and might be implemented using a wired or wireless communication medium. Some examples of a channel 820 might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 806, storage unit 816, media 812, and channel 820. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 800 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A vehicle control system, comprising:

at least one memory storing machine-executable instructions; and at least one processor configured to access the at least one memory and execute the machine-executable instructions to:

detect a manual intervention to operation of an adaptive cruise control (ACC) system of a vehicle;

determine that the ACC system has returned to an activated state subsequent to cessation of the manual intervention;

upon the ACC system returning to the activated state, effectuate a post-manual intervention waiting period for a pre-configured time interval;

determine that a steady-state operation of the ACC system is initiated upon cessation of the post-manual intervention waiting period without an additional manual intervention being detected during the post-manual intervention waiting period;

create a steady-state operation dataset which comprises vehicle dynamics data captured during the steady-state operation of the ACC system; and train a personalized ACC driving pattern learning model using the steady-state operation dataset to learn a relationship between a desired following gap and vehicle speed without using vehicle dynamics data captured during the manual intervention and the post-manual intervention waiting period, wherein the desired following gap is defined by at least one of a distance gap or a time gap between a lead vehicle and the vehicle.

2. The vehicle control system of claim 1, wherein:

the manual intervention comprises an overwrite event;

the overwrite event comprises engagement of an accelerator pedal of the vehicle; and the at least one processor is further configured to execute the machine-executable instructions to detect the cessation of the overwrite event, wherein the ACC system automatically returns to the activated state responsive to cessation of the manual intervention.

3. The vehicle control system of claim 2, wherein detecting the cessation of the overwrite event comprises detecting a release of the accelerator pedal.

4. The vehicle control system of claim 1, wherein:

the manual intervention of the ACC system comprises a takeover event;

the takeover event comprises engagement of a braking mechanism of the vehicle; and the at least one processor is configured to determine that the ACC system has returned to the activated state by executing the machine-executable instructions to determine that the ACC system has been reactivated subsequent to dis-engagement of the braking mechanism.

5. The vehicle control system of claim 1, wherein the at least one processor is further configured to execute the machine-executable instructions to:

detect a second manual intervention to the operation of the ACC system;

determine that the ACC system has returned to an activated state subsequent to cessation of the second manual intervention;

upon the ACC system returning to the activated state, effectuate a second post-manual intervention waiting period for the pre-configured time interval;

determine that a second steady-state operation of the ACC system is initiated upon cessation of the second post-manual intervention waiting period without an additional manual intervention being detected during the second post-manual intervention waiting period; and update the steady-state operation dataset to further comprise the vehicle dynamics data captured during the second steady-state operation of the ACC system.

6. The vehicle control system of claim 5, wherein the at least one processor is further configured to execute the machine-executable instructions to:

re-train the personalized ACC driving pattern learning model based on the updated steady-state operation dataset to improve an accuracy of the learned relationship between the desired following gap and the vehicle speed without using vehicle dynamics data captured during the second manual intervention and the second post-manual intervention waiting period.

7. The vehicle control system of claim 1, wherein the at least one processor is further configured to execute the machine-executable instructions to:

determine that the ACC system is in the activated state;

determine, based on the vehicle speed of at least one of the vehicle or a lead vehicle, that a following gap between the vehicle and the lead vehicle is different from the desired following gap indicated by the learned relationship;

determine a target acceleration for achieving the desired following gap;

control an accelerator mechanism of the vehicle to accelerate the vehicle to the target acceleration; and control the accelerator mechanism to cease accelerating the vehicle upon achieving the desired following gap.

8. The vehicle control system of claim 1, wherein the at least one processor is further configured to execute the machine-executable instructions to:

control vehicle dynamics of the vehicle to achieve the desired following gap between the vehicle and the lead vehicle while the ACC system is in the activated state.

9. A method for personalizing an adaptive cruise control (ACC) system of a vehicle, the method comprising:

detecting a manual intervention to operation of the ACC system;

determining that the ACC system has returned to an activated state subsequent to cessation of the manual intervention;

upon the ACC system returning to the activated state, effectuating a post-manual intervention waiting period for a pre-configured time interval;

determining that a steady-state operation of the ACC system is initiated upon cessation of the post-manual intervention waiting period without an additional manual intervention being detected in the post-manual intervention waiting period;

creating a steady-state operation dataset which comprises vehicle dynamics data captured during the steady-state operation of the ACC system;

training a machine learning model using the steady-state operation dataset as ground-truth data to learn a relationship between a desired following gap and a vehicle speed without using vehicle dynamics data captured during the manual intervention and the post-manual intervention waiting period, wherein the desired following gap is defined by at least one of a distance gap or a time gap between a lead vehicle and the vehicle; and controlling vehicle dynamics of the vehicle to achieve the desired following gap between the vehicle and the lead vehicle while the ACC system is in the activated state.

10. The method of claim 9, wherein:

the manual intervention comprises an overwrite event;

the overwrite event comprises engagement of an accelerator pedal of the vehicle; and the method further comprises detecting the cessation of the overwrite event, wherein the ACC system automatically returns to the activated state responsive to cessation of the manual intervention.

11. The method of claim 10, wherein detecting the cessation of the overwrite event comprises detecting a release of the accelerator pedal.

12. The method of claim 9, wherein;

the manual intervention of the ACC system comprises a takeover event;

the takeover event comprises engagement of a braking mechanism of the vehicle; and determining that the ACC system has returned to the activated state comprises determining that the ACC system has been reactivated subsequent to dis-engagement of the braking mechanism.

13. The method of claim 9, further comprising:

detecting a second manual intervention to the operation of the ACC system;

determining that the ACC system has returned to an activated state subsequent to cessation of the second manual intervention;

upon the ACC system returning to the activated state, effectuating a second post-manual intervention waiting period for the pre-configured time interval;

determining that a second steady-state operation of the ACC system is initiated upon cessation of the second post-manual intervention waiting period without an additional manual intervention being detected during the second post-manual intervention waiting period; and updating the steady-state operation dataset to further comprise the vehicle dynamics data captured during the second steady-state operation of the ACC system.

14. The method of claim 9, wherein, during the steady-state operation of the vehicle, the vehicle dynamics data comprises a speed of the vehicle and a following distance between the vehicle and the lead vehicle.

15. Non-transitory computer-readable medium storing machine-executable instructions that, responsive to execution by at least one processor, cause operations to be performed comprising:

detecting a manual intervention to operation of an adaptive cruise control (ACC) system of a vehicle;

determining that the ACC system has returned to an activated state subsequent to cessation of the manual intervention;

upon the ACC system returning to the activated state, effectuating a post-manual intervention waiting period for a pre-configured time interval;

determining that a steady-state operation of the ACC system is initiated upon cessation of the post-manual intervention waiting period without an additional manual intervention being detected during the post-manual intervention waiting period;

creating a steady-state operation dataset which comprises vehicle dynamics data captured during the steady-state operation of the ACC system;

training a machine learning model using the steady-state operation dataset as ground-truth data to learn a relationship between a desired following gap and a vehicle speed without using vehicle dynamics data captured during the manual intervention and the post-manual intervention waiting period, wherein the desired following gap is defined by at least one of a distance gap or a time gap between a lead vehicle and the vehicle; and controlling vehicle dynamics of the vehicle to achieve the desired following gap between the vehicle and the lead vehicle while the ACC system is in the activated state.

16. The non-transitory computer-readable medium of claim 15, wherein the operations further comprise:

detecting a second manual intervention to the operation of the ACC system;

determining that the ACC system has returned to an activated state subsequent to cessation of the second manual intervention;

upon the ACC system returning to the activated state, effectuating a second post-manual intervention waiting period for the pre-configured time interval;

determining that a second steady-state operation of the ACC system is initiated upon cessation of the second post-manual intervention waiting period without an additional manual intervention being detected during the second post-manual intervention waiting period; and updating the steady-state operation dataset to include the vehicle dynamics data captured during the second steady-state operation of the ACC system.

17. The non-transitory computer-readable medium of claim 16, wherein the operations further comprise:

re-training the machine learning model based on the updated steady-state operation dataset to improve an accuracy of the learned relationship between the desired following gap and the vehicle speed without using vehicle dynamics data captured during the second manual intervention and the second post-manual intervention waiting period.

* * * * *